June 6, 1967 N. O. ROSAEN 3,323,648
FILTER DEVICE WITH ELECTRICALLY ACTUATED INDICATING MEANS
Filed Nov. 12, 1964 3 Sheets-Sheet 1

INVENTOR
NILS O. ROSAEN

BY Hawke & Hawke
ATTORNEYS

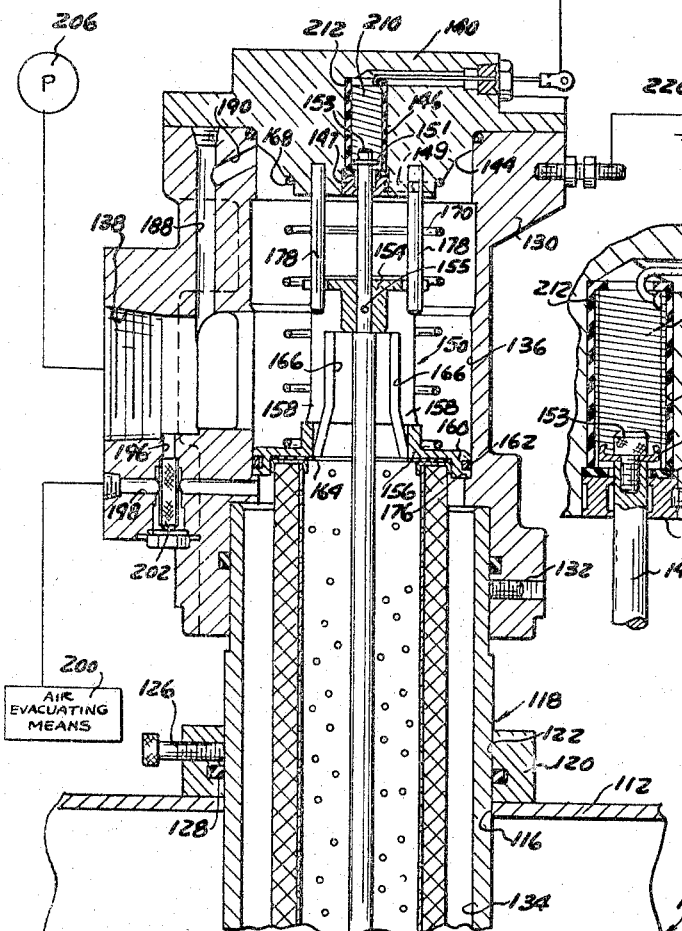
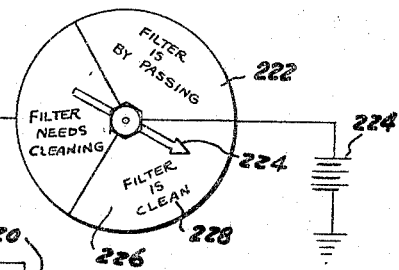
FIG. 4
FIG. 5
INVENTOR
NILS O. ROSAEN
ATTORNEYS

United States Patent Office 3,323,648
Patented June 6, 1967

3,323,648
FILTER DEVICE WITH ELECTRICALLY
ACTUATED INDICATING MEANS
Nils O. Rosaen, Bloomfield Hills, Mich., assignor to The
Rosaen Filter Company, Hazel Park, Mich., a corporation of Michigan
Filed Nov. 12, 1964, Ser. No. 410,675
11 Claims. (Cl. 210—90)

The present invention relates to fluid filter devices, particularly to such a device including means for indicating the clogged condition of the filter element, and more particularly to an improved indicating means for such filter devices.

U.S. Patent No. 3,053,389 issued to O. E. Rosaen and myself on Sept. 11, 1962 discloses and claims a new filter device which includes a filter assembly movable in response to changes in the pressure differential across the filter element and means utilizing this movement to indicate the clogged condition of the filter element. Although the construction disclosed in this patent produces a filter device in which the degree of movement of the filter assembly is essentially a linear function of the degree of clogging of the filter element, the particular indicating means disclosed does not utilize this to produce a visual indication over the full range of movement of the filter assembly. The preferred indicating means disclosed in the aforementioned patent is in the form of an electrical switch actuated only when the filter assembly reaches a predetermined position to energize a signal means. Thus, the signal is produced only when the filter element reaches a predetermined clogged condition and there is no indication of the condition of the filter element over the full range of movement of the filter assembly.

Another U.S. Patent No. 3,080,058 issued to O. E. Rosaen on Mar. 15, 1963, discloses and claims a filter device in which mechanical indicating means are provided which are operable to indicate the position of the filter assembly over the full range of movement thereof. Such an indicating means provides an indication of the filter condition at all times but because it is mechanical rather than electrical it must be positioned relatively near the filter device. Unlike the electrically actuated indicating means of the first mentioned patent, the mechanically actuated indicator cannot be positioned at a point remote from the filter device. Remote positioning of the indicator is desirable in many installations especially where a number of filter devices are utilized so that the conditions of all of the elements can be checked at one time at some convenient or central area.

The present invention provides a filter device which is provided with electrically actuated indicating means operable to indicate the condition of the filter element over the full range of filter conditions. The particular indicating means disclosed permits the indicator to be positioned at any convenient point remote from the filter device.

It is an object then of the present invention to improve filter devices by providing an improved electrically actuated indicating means for indicating the condition of the filter element.

It is another object of the present invention to improve those filter devices having means indicating the clogged condition of the filter element over a wide range by providing electrically actuated means producing this result to thereby permit the indicator to be placed at some convenient point remote from the filter device.

It is still another object of the present invention to improve electrically actuated indicating means for filter devices and the like by providing an electrical circuit, means varying the magnitude of the current through the circuit in response to changes in the clogged condition of the filter element, and means utilizing current flow through the circuit to visibly indicate the condition of the filter element.

Still further objects and advantages of the present invention will readily occur to one skilled in the art to which the invention pertains upon reference to the following drawings in which like reference characters refer to like parts throughout the several views and in which FIG. 1 is a longitudinal cross-sectional view of one preferred filter device utilizing the indicating means of the present invention.

FIG. 4 is a longitudinal cross-sectional view of another preferred filter device utilizing a modified form of the indicating means of the present invention, and FIG. 5 is an enlarged fragmentary view of a portion of the structure illustrated in FIG. 4.

Figure 1:
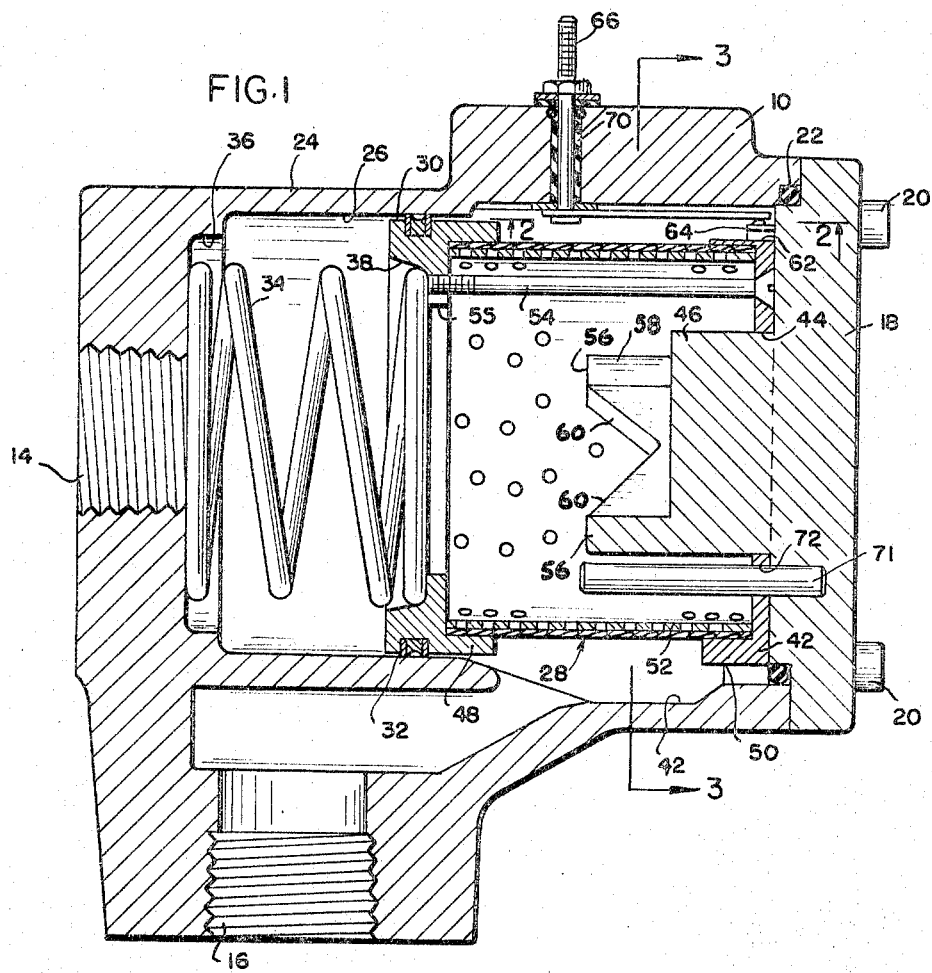

Now referring to the drawings for a more detailed description of the present invention, FIG. 1 illustrates one preferred filter device as comprising a substantially cylindrical housing 10 defining a substantially cylindrical filter chamber 12. The housing 10 is provided with an outlet 14 opening axially at one end of the housing 10 to the filter chamber 12 and an inlet 16 opening radially to the chamber 12. The end of the housing 10 opposite the outlet 14 is preferably closed by a cap member 18 secured to the housing 10 by any suitable means such as bolt members 20 as can best be seen in FIG. 3. An O-ring seal 22 is carried by the housing 10 to prevent fluid leakage between the housing 10 and the cap member 18.

An annular wall 24 is formed in the housing to provide an annular guide surface 26 axially aligned with and closely adjacent the outlet 14. A portion of the wall 24 forms a baffle deflecting fluid from the inlet 16 axially toward the cap member 18.

A filter assembly generally indicated at 28 preferably comprises an annular member 30 axially slidably engaging the guide surface 26. The annular member 30 carries a piston ring seal 32 to prevent fluid leakage between the member 30 and the guide surface 26. A spring member 34 seated in a recess 36 provided in the housing 10 and a recess 38 provided in the annular member 30 urges the member 30 axially along the guide surface 26 and away from the outlet 14.

The filter assembly 28 further preferably comprises a second annular member 42 having a central opening 44 and axially slidably carried on an axially extending boss portion 46 provided on the cap member 18 and extending through the opening 44. It is apparent that the filter assembly 28 is axially slidably supported within the filter chamber 12 by the guide surface 26 and the boss portion 46 and is normally retained in a position against the cap member 18 by the spring member 34.

The annular members 30 and 42 are each provided with an axially extending annular flange portion 48 and 50 respectively which provide the means for carrying a substantially cylindrical filter element 52. The filter element 52 engages beneath the flange portions 48 and 50 and is sandwiched between the members 30 and 42 by a plurality of annularly spaced screw members 54. The annular member 30 is provided with a central opening 55 which provides communication between the interior of the filter element 52 and the outlet 14.

Figure 3:
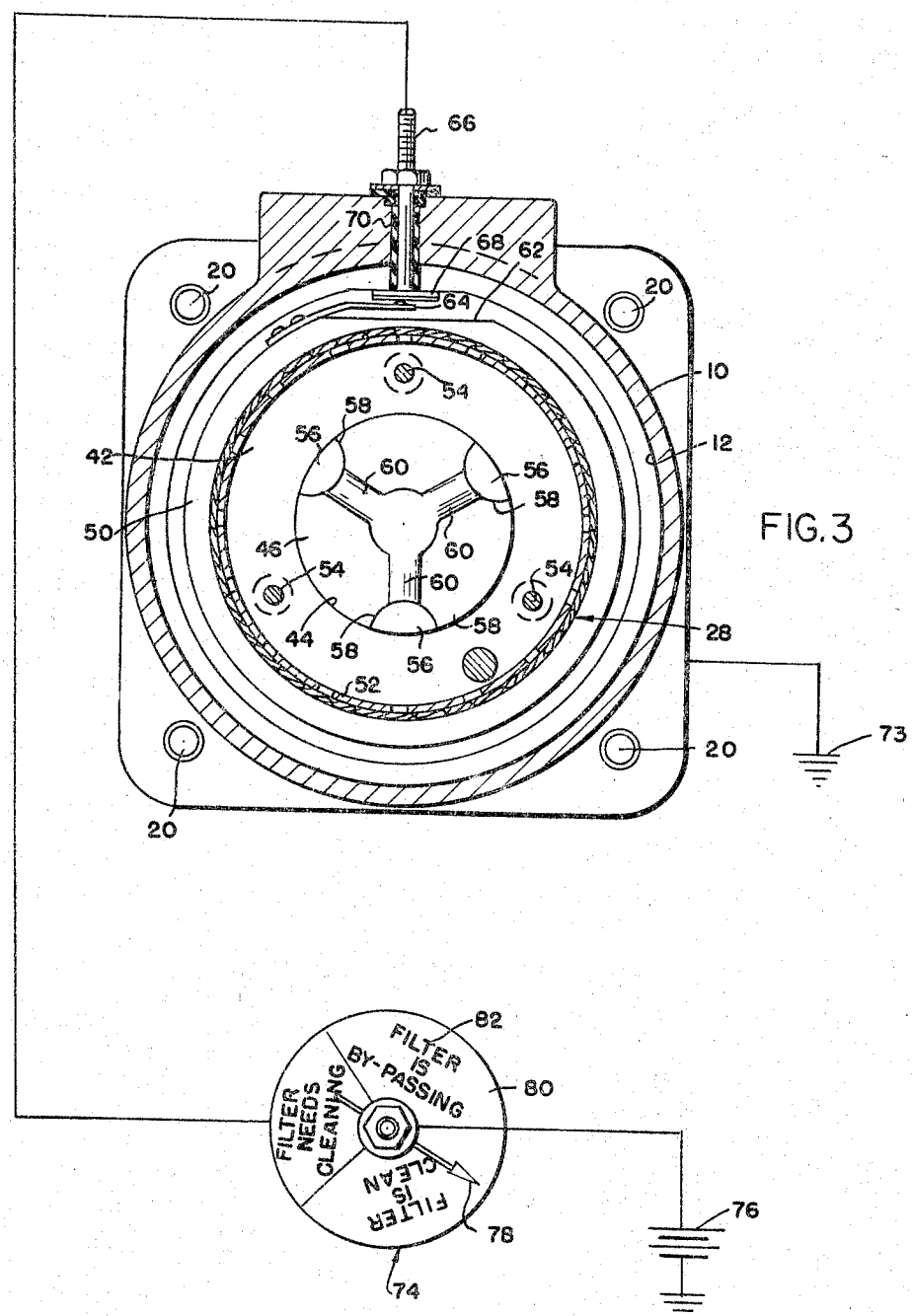
FIG. 3 is a lateral cross-sectional view taken substantially on line 3—3 of FIG. 1 and illustrating portions of the present invention schematically for purposes of clarity.

As can best be seen in FIG. 3, the boss portion 46 is provided at its free end with a plurality of annularly spaced axially extending projections 56 which form a plurality of annularly spaced slots 58 extending axially from the free end of the boss portion 46 and terminating short of the axial length thereof. Support portions 60 extend radially from the boss portion 46 to provide support for the projections 56.

As the invention has thus far been described the fluid to be filtered is delivered to the inlet 16 and directed axially by the baffle portion of wall 24 into the filter chamber 12. The filter assembly 28 is normally in the position illustrated in FIG. 1. With the filter assembly 28 in this position the fluid is directed radially inwardly through the filter element 52 and axially through the central opening 55 of the member 30 and out the outlet 16.

As the filter element 52 becomes clogged, a pressure differential will be produced across the filter element 52 and thus across the radially extending portions of annular members 30 and 42 to cause the filter assembly 28 to move axially on the boss portion 46 and along the guide surface 26 against the force of the spring member 34. The movement of the filter assembly 28 will be essentially a linear function of the degree of clogging of the filter element 52 as described in the aforementioned patents and thus the filter assembly will always assume a position within the filter chamber 12 which corresponds to the degree of clogging of the filter element 52. Thus by providing means for indicating the position of the filter assembly 28 the condition of the filter element 52 can be accurately indicated.

As the filter element 52 continues to become clogged and prior to the degree of clogging reaching a point as to produce the danger of the filter element 52 becoming ruptured, the filter assembly 28 will have moved axially along the boss portion 46 sufficiently to open a fluid path directly from the inlet 16 through the slots 58 of the boss portion 46 and to the outlet 14 bypassing the filter element 52.

Figure 2:
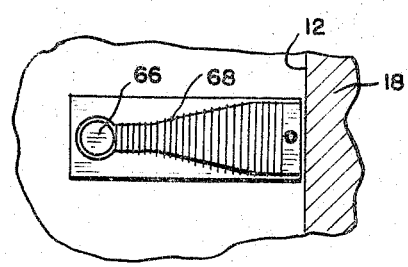
FIG. 2 is a fragmentary cross-sectional view taken substantially on line 2—2 of FIG. 1.

The improvement of the present invention resides in the particular means for indicating the position of the filter assembly 28 and will now be described in detail. Referring again to FIG. 3 a portion of the annular edge of flange portion 50 is preferably removed to form a flat surface 62. A resilient strip 64 of electrically conductive material is preferably secured to the flange portion 50 to extend over the flat surface 62. A bolt 66 extends through the housing 10 and positions a variable resistor member 68, best illustrated in FIG. 2 to be engaged by the strip 64. The bolt member 66 is electrically insulated from the housing 10 by a rubber sleeve 70 and is electrically connected to the variable resistor 68. The resistor 68 extends axially from a point adjacent the end cap 18 and is substantially the same length as the permitted movement of the filter assembly 28. It is apparent then that upon axial movement of the filter assembly 28 the resilient strip 64 will move along the variable resistor 68 to provide contact between the strip 64 and the variable resistor 68 at different portions thereof which depends upon the position of the filter assembly 28. To insure that upon assembly of the device and during movement of the filter assembly 28 the strip 64 will remain in contact with the variable resistor 68 a guide pin 71 is provided in the end cap 18. The guide pin 71 extends through an opening 72 provided in the flange member 42 to provide the proper annular positioning of the filter assembly 28 and the variable resistor 68.

As can best be seen in FIG. 3 the housing 10 is preferably electrically grounded as at 73 and the bolt member 66 is electrically connected across an indicating means 74 to a source of electrical power 76. The indicating means 74 is preferably a conventional electric current meter operable to sense the magnitude of current in the circuit and is operable to actuate a pointer element 78 to a position which depends upon the magnitude of current through the circuit. The indicating means 74 is provided with an indicator plate 80 having suitable indicia 82.

It is apparent then that as the filter element 52 begins to become clogged to produce a movement in the filter assembly 28 the strip 64 of electric conducting material will move along the variable resistor 68 to shorten the effective axial length thereof. With a substantially constant voltage across the indicating means 74 as produced by the power source 76 each change in the effective axial length of the variable resistor 68 will produce a corresponding change in the magnitude of current flow through the indicating means 74. Since the indicating means 74 is essentially a conventional current sensing meter each change in the current will produce a change in the position of the pointer element 78. Thus with the proper indicia 82 provided on the indicator plate 80 an accurate indication of the axial position of the filter assembly 28 will be visibly indicated by the indicating means 74. Since the axial position of the filter assembly 28 depends upon the clogged condition of the filter element 52, the indicating means 74 will thus produce a visible indication of the condition of the filter element 52 at all times during operation of the filter device.

It is apparent also that since the indicating means 74 of the present invention is electrically actuated it can be positioned at a point remote from the filter housing 10. Further, unlike previous electric actuating means for such filter devices, the indicating means of the present invention is operable to indicate the condition of the filter element over the full range of degrees of filter clogging.

FIGS. 4 and 5 disclose another preferred embodiment of the present invention. The particular filter device illustrated in FIGS. 4 and 5 is of a bayonet or mobile type such as those which have been described and claimed in certain copending applications including my copending applications Ser. No. 340,365, filed Jan. 27, 1964 and Ser. No. 341,488, filed Jan. 27, 1964, both now abandoned in favor of continuation application Ser. No. 562,417, filed June 8, 1966. Bayonet or mobile filter devices refer to those filter constructions in which a tubular housing member is provided for carrying the filter element and in which the tubular housing member is positioned with one open end disposed within the fluid reservoir and the opposite end extending exteriorly of the fluid reservoir. Although the particular indicating means will be described with reference to one preferred construction of such mobile or bayonet filter devices it is to be understood that the indicating means of the present invention could be used with the other mobile or bayonet filter devices disclosed in my copending applications with little or no modifications being required.

Now referring to FIGS. 4 and 5, a portion of a fluid reservoir is therein illustrated and is indicated generally by the reference character 110. The fluid reservoir 110 comprises a top plate 112 and is at least partially filled with a suitable fluid 114. An opening 116 is provided in the top plate 112. A preferred filter device is generally indicated at 118 and includes a mounting member 120 secured to the top plate 112 by any convenient means such as welding or the like. A tubular housing member 124 is secured to the mounting member 120 by means of annularly spaced screws 126 and extends axially through an opening 122 provided in the mounting member 120 and the opening 116 provided in the top plate 112 into the interior of the fluid reservoir 110. The tubular member 124 is preferably positioned below the minimum level of the fluid 114 in the reservoir 110. A fluid seal 128 is preferably provided between the mounting member 120 and the tubular housing member 124.

The filter device 118 preferably further comprises a housing member 130 closing the exterior end of the tubular housing member 124 and secured thereto by a plurality of annularly spaced bolts or screws 132. The tubular housing member 124 forms a filter chamber 134 and the housing member 130 forms an outlet chamber 136 communicating with the filter chamber 134. The housing member 130 is provided with an outlet 138 opening radially to the outlet chamber 136.

A cap member 140 is preferably secured to the housing member 130 by any convenient means such as bolts or screws (not shown) and closes the outlet chamber 136. The cap member 140 is provided with a boss portion 144 extending into the housing member 130 and having an axially positioned elongated recess 146 which provides the means for axially slidably carrying an elongated rod member 148. The rod member 148 extends axially through the outlet chamber 136 and the filter chamber 134 and preferably terminates short of the inlet end of the tubular housing member 124 as shown.

To axially slidably mount the elongated rod member 148 in the recess 146 a mounting member 147 is secured within the recess 146 by means of a set screw 149 to axially slidably receive the end of the rod member 148. To prevent the rod member 148 from sliding free of the mounting member 147 an enlarged washer 151 is secured to the end of the rod member by means of an axially inserted screw 153.

A porting member 150 is fixed to the rod member 148 by means of a cross pin 155 and is axially slidably movable therewith. The porting member 150 comprises an upper, substantially annular, radially extending portion 154 and a lower annular radially extending portion 156 joined by a plurality of axially extending legs 158. The lower portion 156 is provided with a peripheral axially extending flange portion 160 which carries a piston ring 162 engaging the inner wall of the housing member 130 and a central opening 164 communicating with the filter chamber 134. The legs 158 define a plurality of annularly spaced slots 166 providing communication between the central opening 164 and the outlet 138 through the outlet chamber 136.

The boss portion 144 of cap member 140 is further provided with an annular recessed portion 168 which forms a seat for one end of the spring 170. The other end of the spring 170 is seated against the annular portion 156 of porting member 150 and urges the porting member 150 and the elongated rod 148 axially away from the cap member 140.

The rod member 148 extends axially through the central opening 164 of porting member 150 and into the filter chamber 134. A substantially cylindrical filter element 172 is fixed to the rod member 148 by means of a closure plate 173 and a nut member 174 received by the threaded free end of a rod member 148. Tightening the nut member 174 urges the filter element 172 axially against the portion 156 of porting member 150 to securely lock the filter element 172, the porting member 150, and the rod member 148 one to the other.

It is apparent that as the invention has thus far been described, the porting member 150, the rod member 148, and the filter element 172 are mounted to move axially within the filter chamber 134 and the outlet chamber 136 against the force of the spring 170. The assembly is normally maintained in the position illustrated in FIG. 4 by means of the spring member 170 urging the annular portion 156 of the porting member 150 against a stop-portion 176 formed in the housing member 130.

The portion 154 of porting member 150 is slotted to receive a pair of guide pins 178 fixed to the cap member 140.

The housing member 130 is provided with an axially extending recess 188 communicating at one end with the outlet 138 and at the other end with a substantially radially extending air outlet pasage 190. The passage 190 extends inwardly to communicate with the outlet chamber 136 in an area adjacent the juncture of the cap member 140 and the housing member 130. The housing member 130 is also provided with a second axially extending passage 196 registering at one end with the outlet 138 and in a medial area with a radially extending passage 198. The passage 198 communicates with an area of the filter chamber 134 closely adjacent the stop portion 176 and extends radially outwardly past the passage 196 and is connected to an air evacuating means 200. A filter means 202 is carried in the passage 196 in a position extending across the passage 198. A fluid pump 206 is preferably connected to the outlet 138.

The operation of the fluid system of FIGS. 4 and 5 as it has thus far been described is as follows:

Fluid is normally pumped by the pump 206 from the reservoir 110 into the filter chamber 134 and is directed radially inwardly through the filter element 172, axially through the central opening 164, through the slots 166 provided in the porting member 150, through the outlet chamber 136 and out the outlet 138.

As the filter element 172 becomes clogged, an increase in the pressure differential across the element 172 will be produced. This will cause a corresponding increase in the pressure differential across the flange portion 156 of porting member 150 and will cause the rod member 148, the filter element 172, and the porting member 150 to be moved axially upwardly against the force of the spring member 170. As described above, the movement of these elements will be essentially a linear function of the degree of clogging of the filter element 172 and thus the free end of the rod member 148 will always assume a position within the recess 146 of cap member 140 which corresponds to the degree of clogging of the filter element 172. Thus by providing means for indicating the position of the free end of the rod member 148 the condition of the filter element 172 can be accurately indicated.

As the filter element 172 continues to become clogged and prior to the degree of clogging reaching a point as to produce a danger of the filter element 172 becoming ruptured, the porting member 150 will have moved axially upwardly a sufficient distance to open a fluid path directly from the inlet end of the tubular housing member 124 past the flange portion 160 of member 156 and to the outlet 138 bypassing the filter element 172.

The particular indicating means is best illustrated in FIG. 5 and comprises an electrical winding 210 carried in the recess 146 and electrically insulated from the cap member 140 by a cylindrical insulator 212 and a washer insulator 214. The washer 151 carried at the end of the rod member 148 is preferably of an electrical conductive material and of a sufficient diameter to engage the electrical winding 210. It is apparent then that upon axial movement of the rod member 148, the washer member 151 will move along the variable resistor formed by the electrical winding 210 to provide contact between the electrical washer 151 and the electrical winding 210 at different portions thereof which depends upon the position of the rod member 148 and therefore the position of the filter element 172 and the porting member 150.

The housing 130 is preferably electrically grounded as at 220 and the electrical winding 210 is electrically connected across an indicating means 222 to a source of electrical power 224. As described above with reference to the indicating means 74, the indicating means 222 is preferably a conventional electric current meter operable to sense the magnitude of current in the circuit and is operable to actuate a pointer element 224 to a position which depends upon the magnitude of current through the current meter. The indicating means 222 is provided with an indicator plate 226 having indicia 228.

It is apparent then that as the filter element 172 begins to become clogged to produce a movement on the rod member 148 the electric washer 151 will move along the electrical winding 210 to shorten the effective axial length thereof. With a substantially constant voltage across the indicating means 222 produced by the power source 224 each change in the effective axial length of the electrical winding 210 will produce a corresponding change in the magnitude of the current flow through the indicating means 222. Since the indicating means 222 is essentially a conventional current sensing meter, each change in the current will produce corresponding changes in the position of the pointed element 224. Thus with proper indicia 228 provided on the indicator plate 226 an accurate indication of the axial position of the rod member 148 will be visibly indicated by the indicating means 222. Since the axial position of the rod member 148 depends upon the clogged condition of the filter element 172 the indicating means 222 will thus produce a visible indication of the condition of the filter element 172.

It is apparent that although I have described but two preferred embodiments of my invention, many changes and modifications can be made therein without departing from the spirit of the invention as expressed by the scope of the appended claims.

I claim:

1. A filter device comprising,
    (a) a housing having a filter chamber and an inlet and an outlet open to said filter chamber,
    (b) a filter assembly axially slidably carried in said filter chamber and comprising a filter element positioned intermediate said inlet and said outlet and pressure responsive means operable to be moved within said chamber to a position which depends upon the pressure differential across said filter element, and
    (c) indicating means actuated by movement of said pressure responsive means and thus movement of said filter assembly to indicate the changes in the pressure differential across said filter element over a range of pressure differentials whereby to indicate the clogged condition of said filter element,
    (d) said indicating means comprising an electric circuit, means actuated by movement of said filter assembly to vary the magnitude of current through said electric circuit in response to changes in the pressure differential across said filter element and means indicating the magnitude of current through said circuit to thereby indicate the condition of said filter element.

2. The filter device as defined in claim 1 and including bypass means operable to open a bypass path directly from said inlet to said outlet bypassing said filter element upon said filter assembly being moved to a position caused by the pressure differential across said filter element reaching a predetermined value.

3. The filter device as defined in claim 1 and in which said indicating means further comprises resistor means connected in said electric circuit and means varying the effective resistance of said resistor means in response to changes in the position of said filter assembly as caused by changes in the pressure differential across said filter element.

4. The filter device as defined in claim 1 and in which said indicating means further comprises a source of substantially constant electrical voltage connected to said electric circuit and meter means indicating the magnitude of current through said circuit.

5. A filter device comprising,
    (a) a housing having a filter chamber and an inlet and an outlet connected to said filter chamber,
    (b) a filter assembly axially slidably carried in said filter chamber and comprising a filter element positioned intermediate said inlet and said outlet,
    (c) said filter assembly further comprising pressure responsive means having one surface exposed to fluid pressure on the inlet side of said filter element and opposite surface exposed to fluid pressure on the outlet side of said filter element and being operable to move said filter assembly within said filter chamber in response to changes in the pressure differential across said filter element,
    (d) indicating means operable to indicate each position of said filter assembly within said filter chamber, and
    (e) said indicating means comprising an electric circuit, means varying the magnitude of current flow through said circuit in accordance with the position of said filter assembly in said filter chamber, and means actuated in response to changes in the magnitude of current flow to indicate the position of said filter assembly.

6. The device as defined in claim 5 and including valve means operable upon said filter assembly moving to a predetermined position to open a fluid path directly from the inlet side of said filter element to said outlet.

7. The device as defined in claim 5 and in which said indicating means further comprises resistor means connected in said electric circuit, a contact member connected in said circuit and engaging said resistor means, said contact member being carried by and movable with said filter assembly to engage different portions of said resistor means at different positions of said filter assembly and thereby vary the effective resistance produced by said resistor means.

8. A filter device comprising,
    (a) a housing having a filter chamber and an inlet and an outlet connected to said filter chamber,
    (b) a filter assembly axially slidably carried in said filter chamber comprising a filter element positioned intermediate said inlet and said outlet,
    (c) said filter assembly further comprising pressure responsive means having one surface exposed to fluid pressure on the inlet side of said filter element and an opposite surface exposed to fluid pressure on the outlet side of said filter element and being operable to move said filter assembly within said filter chamber in response to changes in the pressure differential across said filter element to thereby move in response to changes in the clogged condition of said filter element,
    (d) indicating means operable to indicate each position of said filter assembly within said filter chamber,
    (e) said indicating means comprising an electric circuit, resistor means connected in said electric circuit, a contact member connected in said circuit and engaging said resistor means, said contact member and said resistor means being relatively movable upon movement of said filter assembly so that said contact member engages different portions of said resistor means at different positions of said filter assembly and thereby varies the effective resistance produced by said resistor means, and means actuated in response to changes in magnitude of current flow through said circuit to indicate the position of said filter assembly.

9. A filter device as defined in claim 8 and in which said resistor means is carried in said housing and said contact is carried by said filter assembly in engagement with said resistor.

10. A filter device as defined in claim 8 and in which said resistor means is carried in a cylindrical bore formed in said housing, a rod member is carried by said filter assembly and moves axially upon movement of said filter assembly, one end of said rod member extending into said cylindrical bore, and said contact member comprises a washer carried on the end of said rod member and engaging said resistor means.

11. A device as defined in claim 8 and including valve means operable upon said filter assembly moving to a predetermined position to open a fluid path directly from the inlet side of said filter element to said outlet.

References Cited

UNITED STATES PATENTS

| | | | |
|---|---|---|---|
| 3,069,645 | 12/1962 | Henke | 73—398 X |
| 3,080,058 | 3/1963 | Rosaen | 210—90 |
| 3,157,851 | 11/1964 | Henderson | 73—398 X |

SAMIH N. ZAHARNA, *Primary Examiner*.